United States Patent

[11] 3,590,706

| [72] | Inventor | Marcus J. Millet<br>Rochester, N.Y. |
|---|---|---|
| [21] | Appl. No. | 783,227 |
| [22] | Filed | Dec. 12, 1968 |
| [45] | Patented | July 6, 1971 |
| [73] | Assignee | Eastman Kodak Company<br>Rochester, N.Y. |

[54] ADAPTER FOR IGNITING PERCUSSION-IGNITABLE FLASHLAMP UNITS
22 Claims, 5 Drawing Figs.

| [52] | U.S. Cl. | 95/11.5, 240/37.1, 431/93 |
|---|---|---|
| [51] | Int. Cl. | G03b 9/70 |
| [50] | Field of Search | 95/11, 11.5; 240/1.3, 37.1; 431/92, 93, 94, 95 |

[56] References Cited
UNITED STATES PATENTS

| 2,091,601 | 8/1937 | Leijdens | 431/93 |
|---|---|---|---|
| 3,473,880 | 10/1969 | Wick | 240/1.3 X |

FOREIGN PATENTS

| 1,192,047 | 4/1965 | Germany | 240/1.3 |

*Primary Examiner*—Samuel S. Matthews
*Assistant Examiner*—Fred L. Braun
*Attorneys*—Robert W. Hampton and William C. Dixon, III ABSTRACT: An adapter is provided to enable use of percussion-ignitable flashlamp units with photographic apparatus designed for use with electrically ignitable flashlamp units. A camming member movable in response to rotation of a flash cube socket on the photographic apparatus cocks a spring loaded actuating member and a solenoid controls movement of the actuating member to fire a received percussive lamp.

MARCUS J. MILLET
INVENTOR.

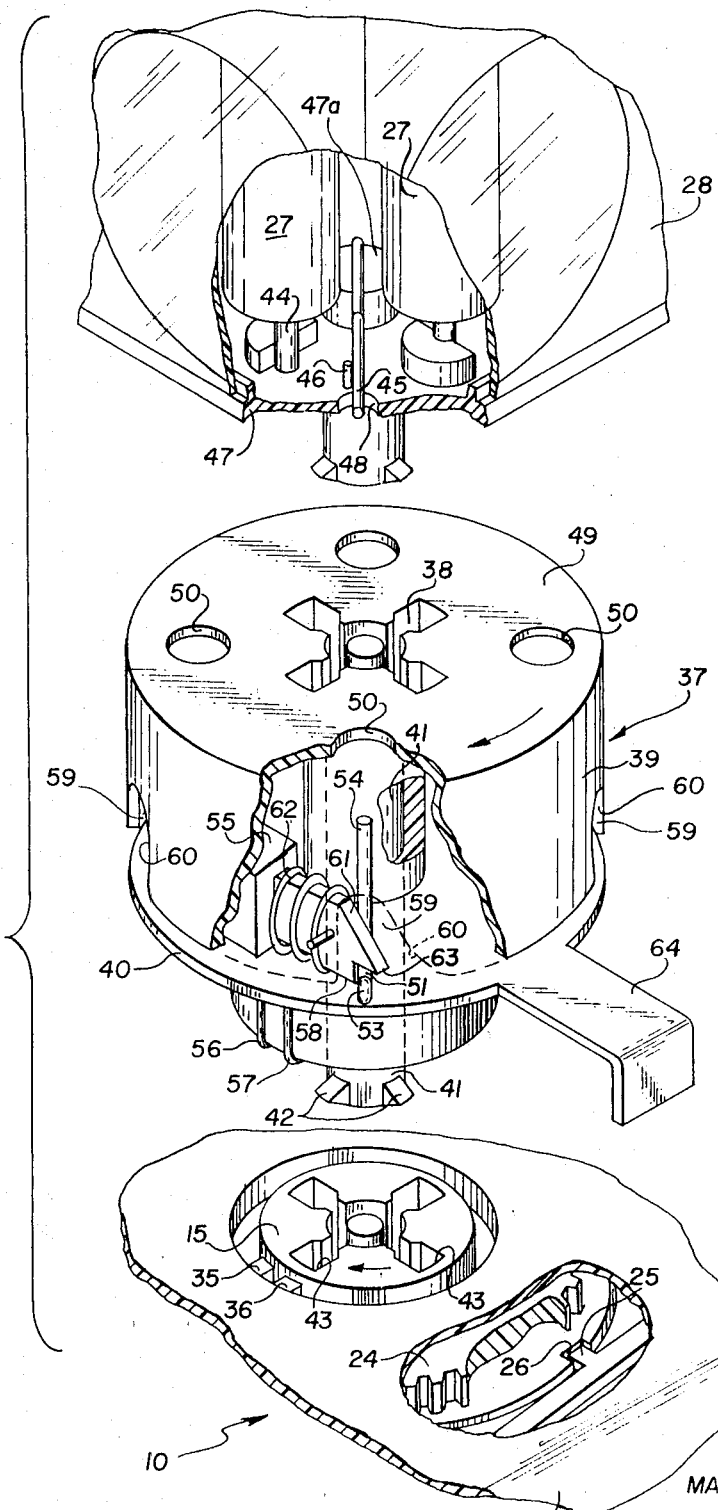

ADAPTER FOR IGNITING PERCUSSION-IGNITABLE FLASHLAMP UNITS

CROSS-REFERENCE TO RELATED APPLICATIONS

Reference is made to the following copending U.S. Pat. applications:

Ser. No. 765,930, entitled "Multilamp Flash Unit," filed Oct. 8, 1968 in the name of David E. Beach;

Ser. No. 765,931, entitled "Socket For Multilamp Flash Unit," filed Oct. 8, 1968 in the name of David E. Beach;

Ser. No. 766,739, entitled "Apparatus For Actuating Firing Of Percussion-Ignitable Flash Lamps and Operating Mechanism Therefor," filed Oct. 11, 1968 in the name of William T. Hochreiter;

Ser. No. 767,101, entitled "Impact Mechanism For Firing Percussion-Ignitable Multilamp Photoflash Units," filed Oct. 14, 1968 in the name of David E. Beach;

Ser. No. 767,098, entitled "Firing Mechanism For Percussively Ignitable Flash Units," Oct. 14, 1968 in the name of David E. Beach; and Ser. No. 767,348, entitled "Device For Igniting Percussion-Ignitable Flash Lamps," filed Oct. 14, 1968 in the name of Donald M. Harvey.

BACKGROUND OF THE INVENTION

1. Field of the Invention

This invention relates generally to photographic apparatus, and particularly to an adapter enabling use of mechanically ignitable flashlamp units with photographic apparatus that have been designed for use with electrically ignitable flashlamp units.

2. Description of the Prior Art

It has long been known in the photographic art to ignite an electrically ignitable photoflash lamp by closing an electrical circuit to interconnect such a lamp and a suitable source of electrical potential. Photographic cameras having synchronizing contacts that are operative, upon opening of the camera shutter, to close such a circuit and thereby ignite an electrically ignitable flashlamp connected thereto are well known and commonplace in the photographic market.

There has recently been developed a self-contained, percussion-ignitable, flashlamp unit having a lamp envelope enclosing a combustible material and a combustion-supporting gas, with a metal tube extending from the bottom of the lamp envelope and containing a primer charge that is ignitable in response to percussive contact with the tube by a mechanically actuated striking member or hammer built into photographic apparatus adapted to receive such a unit. A flashlamp unit of this kind is described in, copending U.S. Pat. application Ser. No. 765,930, entitled "Multilamp Flash Unit," filed Oct. 8, 1968, in the name of David E. Beach. A socket that is suitable for receiving and operatively supporting such a flashlamp unit is described in commonly assigned, copending U.S. Pat. application Ser. No. 765,931, entitled "Socket For Multilamp Flash Unit," filed Oct. 8, 1968, in the name of David E. Beach. A photographic apparatus and a mechanism therein suitable for percussively igniting such a flashlamp unit supported in such a socket are described in commonly assigned, copending U.S. Pat. application Ser. No. 766,739, entitled "Apparatus For Actuating Firing of Percussion-Ignitable Flash Lamps And Operating Mechanism Therefor," filed Oct. 11, 1968, in the name of William T. Hochreiter.

In commonly assigned, copending U.S. Pat. application Ser. No. 767,101, entitled "Impact Mechanism For Firing Percussion-Ignitable Multilamp Photoflash Units," filed Oct. 14, 1968, in the name of David E. Beach, there is described a mechanism wherein the striking member, mounted in a photographic apparatus adjacent to a rotatable socket for receiving a multilamp flash unit, is moved to a cocked position by a cam surface provided either in the socket or on a received flash unit during indexing rotation of the socket. In commonly assigned, copending U.S. Pat. application Ser. No. 767,098, entitled "Firing Mechanism For Percussively Ignitable Flash Units," filed Oct. 14, 1968, in the name of David E. Beach, there is described a mechanism wherein the striking member, mounted either in a rotatable socket in a photographic apparatus or on a received multilamp flash unit for rotation therewith, is moved to a cocked position by its coaction with a fixed cam surface on the apparatus during rotation of the socket.

Thus there have been described in prior-filed, patent applications various photographic-apparatus mechanisms which are operative to move a striking member first to a cocked position and then from the cocked position into contact with a percussion-ignitable flashlamp unit to effect percussive ignition of the unit.

In commonly assigned, copending U.S. Pat. application Ser. No. 767,348, entitled "Device For Igniting Percussion-Ignitable Flash Lamps," filed Oct. 14, 1968, in the name of Donald M. Harvey, there is described an adapter enabling use of percussion-ignitable flashlamp units with a photographic apparatus designed for use with electrically ignitable flashlamp units, the adapter comprising a socket for receiving a percussion-ignitable flashlamp unit, a striking member movable into contact with a received flash unit to effect percussive ignition of the unit, and a solenoid electrically connectable to a synchroflash circuit in the apparatus for effecting movement of the striking member into contact with the unit. That application describes alternative ways of effecting movement of the striking member into contact with the flash unit including solenoid actuated release of a spring loaded striking member for spring-urged movement of the striking member toward the unit. No means is there disclosed, however, for returning the spring loaded striking member of such an adapter from its position of contact with the flash unit to its cocked position in response to operation of the photographic apparatus. There is thus a need, for use in an adapter of the general type described in said application of Harvey, of means for moving such a striking member to a cocked position, in response to operation of the photographic apparatus, from which it may subsequently be released for spring-urged movement toward a received flash unit.

SUMMARY OF THE INVENTION

Accordingly, an object of the present invention is to provide an adapter enabling use of percussion-ignitable flashlamp units with a photographic apparatus, such as a camera, that has been designed for use with electrically ignitable flashlamp units, wherein means are provided for moving a percussive ignition-initiating or actuating member, in opposition to the influence of biasing means, to a cocked position from which the member may subsequently be released for movement by the biasing means to another position to effect percussive ignition of a percussion-ignitable flashlamp unit.

Another object is to provide such an adapter that is suitable for use with a photographic apparatus, such as a camera, of the type including a rotatable socket for receiving a multilamp electrically ignitable flash unit, wherein the adapter includes a rotatable socket for receiving a multilamp percussion-ignitable flash unit and means responsive to operation of the apparatus for moving the actuating member to its cocked position during indexing rotation of the adapter socket from one lamp-firing position to the next.

To meet these and other objects, the present invention provides an adapter enabling use of a percussion-ignitable flashlamp unit with photographic apparatus of the type having a socket for receiving an electrically ignitable flashlamp unit, a synchroflash circuit for energizing an electrically ignitable flashlamp unit received by the socket, and means for effecting operation of the apparatus. The adapter comprises means for receiving a percussion-ignitable flashlamp unit; means, movable from a first position to a second position, for initiating percussive ignition of, or actuating, a percussion-ignitable flashlamp unit received by the receiving means; means for urging the actuating means from the first position toward the second position; means, operatively associated with the actuating means and connectable to and energizable by the synchroflash circuit of the apparatus, for controlling movement of the actuating means from the first position toward the second position; means, operatively associated with the actuating means and associatable with and actuatable by the effecting means of the apparatus, for returning the actuating means from the second position to the first position; and means for operatively connecting the adapter to the socket of the apparatus.

In the illustrated embodiments of the invention, the percussion-ignitable flashlamp unit receivable by the receiving means is a multilamp unit containing a plurality of percussion-ignitable flashlamps, the receiving means being rotatable to successively place the percussion-ignitable lamps of the multilamp unit received by the receiving means at an operative site. The actuating means includes, either integral therewith or separate therefrom, a striking element that is moved into contact with the flashlamp unit received by the receiving means to effect percussive ignition of the received unit in response to movement of the initiating means from the first position to the second position. The controlling means includes means for alternatively preventing and permitting movement of the actuating means by the urging means from the first position toward the second position, the controlling means including a solenoid engageable with and disengageable from the actuating means to retain the actuating means in and release the actuating means from the first position, respectively. The returning means includes camming means engageable with the actuating means for moving the actuating means from the second position to the first position, the camming means being rotatable with the receiving means by the effecting means of the apparatus when the adapter is operatively connected to the socket of the apparatus by the adapter connecting means.

The invention, and its objects and advantages, will become more apparent in the detailed description of the illustrated embodiments presented below.

BRIEF DESCRIPTION OF THE DRAWINGS

In the detailed description of the illustrated embodiments of the invention presented below, reference is made to the accompanying drawings, in which:

FIG. 2 is an enlarged, exploded view, in perspective, of the adapter of FIG. 1, showing the adapter in a position suitable for insertion into the camera socket with the percussion-ignitable multilamp unit above the adapter;

DESCRIPTION OF THE ILLUSTRATED EMBODIMENTS

Because certain parts of photographic and related apparatus are well known, the following description is directed in particular to those elements forming, or cooperating directly with, the present invention, elements that are not specifically shown or described herein being understood to be selectable from those known in the art.

The Preferred Embodiment

Figure 1:
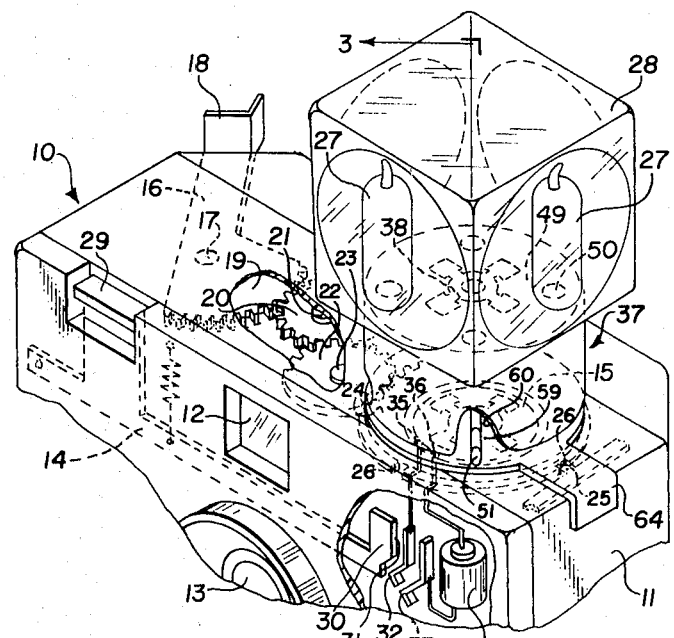
FIG. 1 is a fragmentary perspective view of a photographic camera having a rotatable socket for receiving a multilamp unit of the type having a plurality of electrically ignitable flashlamps, showing the adapter of the present invention inserted in the camera socket with a percussion-ignitable multilamp unit on the adapter.

FIG. 1 of the drawing illustrates a portion of a camera 10 having a housing 11, a viewfinder 12, a lens 13, a shutter-release member 14, a socket 15 for operatively supporting a multilamp flash unit (not shown) having a plurality of electrically ignitable flashlamps, and an operating lever 16 for effecting film winding, shutter cocking, and socket rotation. As shown, operating lever 16 is pivotally mounted as at 17 for rotational movement, lever 16 having at one end an upwardly extending tab 18, which is externally accessible for movement by the camera operator, and at another end a gear sector 19, shown meshed with gear 20 rotatably mounted as at 21. Gear 20, in turn, is meshed with another gear 22 rotatably mounted as at 23, which, in turn, is meshed with a gear 24 coupled to socket 15. As can be seen, actuation of tab 18 by the camera operator effects rotation of socket 15 and the received flashlamp unit from one-lamp firing position to another. Cooperating with the socket rotating mechanism just described is a socket indexing means comprising a pawl 25 which is engageable with one of a plurality of notches 26 in socket 15, each notch 26 corresponding in angular position with a lamp 27 of the received multilamp flash unit 28, the indexing means thereby serving to positively stop socket rotation when the socket has reached an operative orientation.

The shutter-release member 14 includes an externally accessible portion 29, which is depressable by the camera operator to effect shutter release, and at the right-hand end of member 14, as viewed in FIG. 1, another portion 30 having a cam surface 31 for closing a pair of synchroflash contacts 32 and 33, which are connected electrically to a source of electrical potential such as a battery 34 and to a pair of electrical contacts 35 and 36 in socket 15. Electrical contacts 35 and 36 are electrically connectable to corresponding leads depending from an electrically ignitable flashlamp of a multilamp flash unit (not shown) that may be inserted into socket 15. As is well known in the photographic art, the camera operator's depression of portion 29 of shutter-release member 14 thus effects shutter release and simultaneous closing of synchroflash contacts 32 and 33 to ignite an electrically ignitable flashlamp unit received in socket 15. Shown inserted in socket 15 in FIG. 1 is an adapter 37 constructed according to the present invention, adapter 37 having at the top thereof a socket 38 for receiving multilamp flash unit 28 having a plurality (four) of percussion-ignitable flashlamps 27 therein.

FIG. 2 illustrates adapter 37 in greater detail and shows the relationship between adapter 37, camera socket 15, into which the adapter is insertable, and percussion-ignitable flashlamp unit 28 which is insertable into adapter socket 38. As best seen in FIG. 2, adapter 37 is generally of cylindrical shape, the cylindrical sidewall 39 being coupled to socket 38 for rotation therewith. Depending from socket 38 beneath the base 40 of adapter 37 is a mounting stem 41 having a plurality of lugs 42 which are insertable into the channel portions 43 of socket 15, lugs 42 when so inserted serving to retain adapter 37 against inadvertent dislodging during operation. Mounting stem 41 is coupled to socket 38, which, in turn, is coupled to cylindrical sidewall 39, so that rotation of camera socket 15 effects simultaneous rotation of mounting stem 41, socket 38, and cylindrical sidewall 39 when adapter 37 is inserted in camera socket 15. In this fashion, a percussion-ignitable flashlamp unit inserted in the adapter is rotated from one lamp-firing position to another upon normal operation of the camera socket rotating mechanism.

Figure 3:
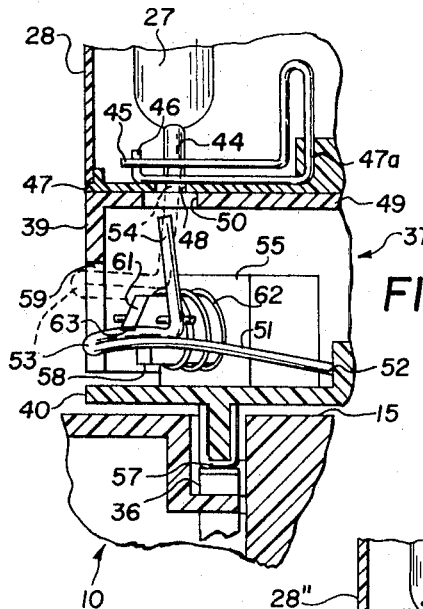
FIG. 3 is an enlarged, fragmentary, sectional view, taken along line 3–3 of FIG. 1, showing portions of the adapter, the camera socket, and the percussion-ignitable multilamp unit in their operative relationship.

The percussion-ignitable flashlamp unit 28 for which the adapter 37 herein illustrated is intended contains a plurality (four) of percussion-ignitable flashlamps 27, each having an ignition tube or primer element 44 depending therefrom which, when struck by a suitable striker or hammer, ignites the lamp, as described in the aforementioned commonly assigned copending U.S. patent applications. The percussion-ignitable multilamp flash unit 28 illustrated herein is of the type that includes, for each flashlamp 27, a striker 45 in the form of a resilient spring, shown retained in a cocked position by a stationary cocking pin 46 extending upwardly from the base 47 of the flashlamp unit. Cocking pin 46 may be separate from striker 45 or it may be integral therewith, as shown in FIG. 3, comprising a fixed end portion of striker 45, in which case the whole striker operates in a manner similar to that of a common safety pin, striker 45 being secured to base 47 as at 47a. Adjacent to each cocking pin 46 and beneath its associated striker 45 is an opening 48 through which a suitable actuating member in the adapter can protrude to push striker 45 in an upward direction a sufficient distance to disengage striker 45 from cocking pin 46 and thereby allow the potential energy in the cocked striker to move the striker into percussive contact with the ignition tube 44 of the adjacent lamp 27.

In the top 49 of adapter 37, surrounding socket 38 in an annular fashion, is a plurality of openings 50 which are angularly aligned with openings 48 of received flashlamp unit 28. Shown in FIGS. 2 and 3 is a means for initiating percussive ignition of received percussion-ignitable flashlamp unit 28. As illustrated, the percussive ignition-initiating, or actuating means comprises an actuating member in the form of a resilient spring 51 fixedly mounted as at 52 and having an outwardly extending portion 53 and an upwardly extending portion 54. Portions 53 and 54 are movable in a generally upward direction from a first, or cocked, position, shown in solid lines, to a second position, shown in broken lines, in which upwardly extending portion 54 protrudes through one of openings 50 and the overlying opening 48 to disengage striker 45 from cocking pin 46. The actuating member or spring 51, as illustrated in solid lines, is in a cocked position, in which member 51 has stored therein potential energy providing a biasing influence for urging member 51 upwardly upon its release from the cocked position.

Shown adjacent to member 51 is a controlling means for alternatively preventing and permitting upward movement of member 51 by said biasing influence. The controlling means illustrated comprises a solenoid 55, which is electrically connectable, through leads 56 and 57 and camera socket contacts 35 and 36, to the camera synchroflash circuit for energization thereby during picture-taking operation of the camera. Included in solenoid 55 is a movable member or armature 58 that is movable horizontally, as viewed in FIG. 3, from an extended position of engagement with actuating member 51 to a retracted position of disengagement from member 51 upon energization of the solenoid coil, not shown, by operation of the camera as aforesaid. As will be apparent to those skilled in the art, when adapter 37 is operatively received in socket 15, the camera operator's depression of shutter-release member portion 29 to effect picture-taking operation of the camera is thus operative to energize solenoid 55 and thereby move solenoid member 58 out of engagement with actuating member 51 to release member 51 for movement from its cocked position upwardly into contact with received flashlamp unit 28 to effect percussive ignition of the operatively oriented flashlamp 27 therein.

As can be seen most readily in FIGS. 1 and 2, the lower portion of cylindrical sidewall 39 of adapter 37 has a plurality of cutout portions 59 spaced therearound, corresponding in number and location to the percussion-ignitable lamps 27 of received flashlamp unit 28. Each cutout portion 59 provides a camming means 60 engageable with the outwardly extending portion 53 of actuating member 51 when member 51 is in its upper, or lamp-igniting, position to effect the return of member 51 to its lower, or cocked, position upon rotation of socket 38 and cylindrical sidewall 39. With this arrangement, outwardly extending portion 53 of actuating member 51 acts as a cam follower during rotation of sidewall 39 and camming means 60 in effecting return movement of member 51 from its lamp-igniting position to its cocked position. To facilitate downward movement of actuating member 51 to its cocked position, solenoid member 58 is provided with a cam surface 61 which is engageable by outwardly extending portion 53 during such downward movement of member 51 to move member 58 out of the path of travel of member 51 and thereby permit member 51 to reach its cocked position without interference by solenoid member 58 when in its extended position. As shown in FIGS. 2 and 3, solenoid 55 is provided with spring means 62 for returning member 58 from its retracted position to its extended position when solenoid 55 is not energized. Thus, after actuating member 51 has passed beyond the end 63 of member 58 and reached its lowermost position, the spring means 62 is operative to return member 58 to its extended position to engage member 51 and thereby retain member 51 against upward movement until solenoid 55 is again energized by subsequent picture-taking operation of the camera. Because cylindrical sidewall 39 is coupled to socket 38 for rotation therewith by the socket rotating mechanism of the camera, the camming means 60 in the cutout portions 59 of cylindrical sidewall 39 are effective in providing a means for returning member 51 to its cocked position during rotation of received unit 28 from one lamp-firing position to the next. Thus, by the time the next flashlamp 27 of received flash unit 28 has been rotated to its operative site above actuating member 51, member 51 has been returned to its cocked position to be ready for another cycle of operation.

It should be understood that the socket rotating mechanism shown in FIG. 1 is for purposes of illustration only, other means of effecting socket rotation being well known in the camera art. Thus, for example, the camera socket could be rotated automatically in response to the camera operator's depression of the shutter-release member, or the camera socket could be rotated in response to the operator's movement of a lever or knob provided on the camera to effect socket rotation only or socket rotation in combination with shutter cocking, film winding, and/or some other phase of the cyclic operation of a camera. The particular means of effecting camera socket rotation, therefore, is not critical to the operation of the adapter of the present invention, the significant feature of adapter 37 being the inclusion of means, operatively associated with the actuating member 51 and associatable with and actuatable by some means for effecting operation of the camera, for returning the actuating member 51 from its lamp-igniting position to its cocked position. The phrase "means for effecting operation of the camera" is meant to include any means, such as those mentioned, for accomplishing some part of the cyclic operation of the camera.

It should also be understood that the adapter of the present invention comprises, basically, two pairs of elements, one pair being rotatable relative to the other pair. In the illustrated embodiment of FIGS. 1—3, one pair comprises socket 38 and camming means 60, both socket 38 and camming means 60 being rotatable together upon rotation of mounting stem 41 by the camera socket rotating mechanism; the other pair comprises actuating member 51 and solenoid 55, both of which are prevented from rotating with socket 38 and camming means 60 by virtue of their being coupled to a securing means, such as hook member 64, which is engageable with camera housing 11 when adapter mounting stem 41 is fully inserted in camera socket 15, the securing means or hook member 64 thereby serving to prevent rotation of actuating member 51 and solenoid 55 with socket 38 and camming means 60 upon rotation of camera socket 15.

Alternative Embodiments

Figure 4:
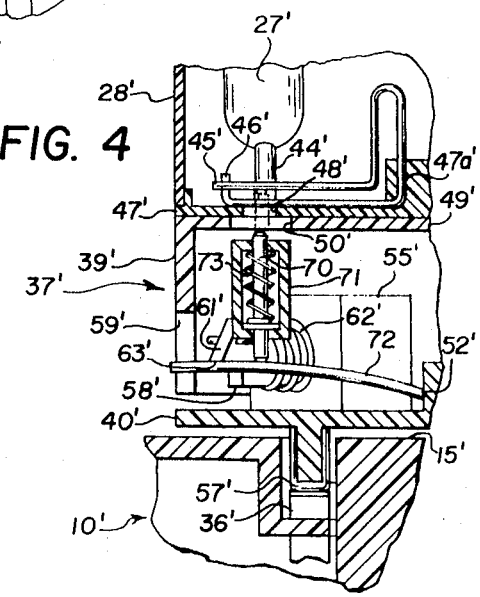
FIG. 4 is an enlarged, fragmentary, sectional view similar to that of FIG. 3 but showing a first alternative embodiment of the adapter of the present invention.
Figure 5:
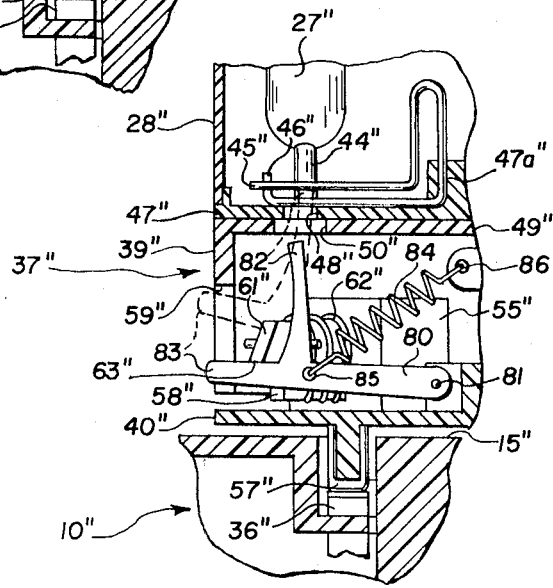
FIG. 5 is an enlarged, fragmentary, sectional view similar to that of FIG. 4 but showing a second alternative embodiment of the adapter of the present invention.

FIGS. 4 and 5 illustrate alternative embodiments of the adapter of the present invention, parts that are the same as those already described with reference to the preferred embodiment of FIGS. 1—3 being designated by the same reference numerals primed in FIG. 4 and the same reference numerals double-primed in FIG. 5. FIG. 4 shows a first alternative embodiment wherein the upwardly extending portion 54 of the actuating member 51 in FIG. 3 is replaced by a separately movable striking element or pin 70 vertically slideable within a bushing 71, pin 70 being movable in an upward direction in response to upward movement of the actuating member 72 and in a downward direction by a spring or other biasing means 73 urging pin 70 toward member 72.

FIG. 5 illustrates a second alternative embodiment in which the actuating member, instead of taking the form of a resilient spring as in FIGS. 1—4, takes the form of a rigid member 80, pivotally mounted as at 81, having an upwardly extending portion 82 and an outwardly extending portion 83, member 80 being biased for movement in a clockwise direction, as viewed in FIG. 5, by a spring 84 connected to member 80 at 85 and to a nonrotatable portion of the adapter as at 86. In the embodiment of FIG. 5, rigid actuating member 80 and spring 84 perform the same function as does the single-piece, resilient-spring-type actuating member 51 in the embodiment of FIGS. 1—3 and as do the resilient-spring-type actuating member 72 and separate striking pin 70 in the embodiment of FIG. 4.

It should be understood that the adapter of the present invention is not restricted to use with percussion-ignitable flashlamp units of the type shown herein for illustrative purposes only. For example, the actuating member or its equivalent could be moved into direct contact with the ignition tube or primer element of a percussion-ignitable flashlamp in the received unit, the significant feature in this regard being that movement of the actuating member or its equivalent into contact with some part of the percussion-ignitable flashlamp unit is effective to initiate percussive ignition of a lamp in that unit. It is also within the spirit of the present invention not to limit the adapter to use with percussion-ignitable flashlamp units containing a plurality of percussion-ignitable lamps. That is to say, the adapter of the present invention could be used to receive a percussion-ignitable single-lamp flash unit, and the adapter could be made insertable into a single-lamp-receiving socket of the photographic apparatus, the significant feature here being that the means for returning the actuating member from its lamp-igniting position to its cocked position is actuatable by some means in the apparatus for effecting one or more phases of the cyclic operation of the apparatus, as discussed hereinabove.

The invention has been described in detail with particular reference to the illustrated preferred and alternative embodiments thereof, but it will be understood that variations and modifications can be effected within the spirit and scope of the invention.

I claim:
1. An adapter to enable use of a percussion-ignitable flashlamp unit with photographic apparatus of the type having a socket for receiving an electrically ignitable flashlamp unit, a synchroflash circuit for energizing the electrically ignitable flashlamp unit received by the socket, and means for effecting operation of the apparatus, said adapter comprising:
   a. means for receiving the percussion-ignitable flashlamp unit;
   b. means, movable from a first position to a second position, for actuating percussive ignition of the percussion-ignitable flashlamp unit received by said receiving means;
   c. means for urging said actuating means from said first position toward said second position;
   d. means, operatively associated with said actuating means and connectable to and energizable by the synchroflash circuit of the apparatus, for controlling movement of said actuating means from said first position toward said second position;
   e. means, operatively associated with said actuating means and associatable with and actuatable by the effecting means of the apparatus, for returning said actuating means from said second position to said first position; and
   f. means for operatively connecting said adapter to the socket of the apparatus.

2. The adapter claimed in claim 1 wherein the percussion-ignitable flashlamp unit receivable by said receiving means is a multilamp unit containing a plurality of percussion-ignitable flashlamps, said receiving means being rotatable to successively place the percussion-ignitable lamps of the multilamp unit received by said receiving means at an operative site.

3. The adapter claimed in claim 1 wherein said actuating means includes a striking element that is moved into contact with the flashlamp unit received by said receiving means to effect percussive ignition of the received unit in response to movement of said actuating means from said first position to said second position.

4. The adapter claimed in claim 1 wherein said controlling means includes means for alternatively preventing and permitting movement of said actuating means by said urging means from said first position toward said second position.

5. The adapter claimed in claim 1 wherein said controlling means includes a solenoid having a member movable from a first location to a second location.

6. The adapter claimed in claim 5 wherein said member is engageable with said actuating means, said member when in said first location thereby retaining said actuating means in said first position.

7. The adapter claimed in claim 6 wherein said member is movable from said first location to said second location in response to energization of said solenoid, said member thereby releasing said actuating means for movement from said first position.

8. The adapter claimed in claim 1 wherein said returning means includes camming means, engageable with said actuating means, for moving said actuating means from said second position to said first position.

9. The adapter claimed in claim 8 wherein said camming means is rotatable relative to said actuating means to move said actuating means from said second position to said first position.

10. The adapter claimed in claim 9 wherein said receiving means is rotatable relative to said actuating means and coupled to said camming means, said receiving means and said camming means both being rotatable by the effecting means of the apparatus when said adapter is operatively connected to the socket of the apparatus by said connecting means.

11. An adapter to enable use of a multilamp photoflash unit of the type having a plurality of percussion-ignitable flashlamps with a photographic camera that includes a rotatable socket for receiving a multilamp photoflash unit of the type having a plurality of electrically ignitable flashlamps, means for rotating the socket to successively place the electrically ignitable lamps of the multilamp unit received by the socket in an operative orientation, and a synchroflash circuit for energizing each operatively oriented electrically ignitable lamp of the received unit is synchronization with picture-taking operation of the camera, said adapter comprising:
   a. means for receiving the multilamp photoflash unit of the type having a plurality of percussion-ignitable flashlamps, said receiving means being rotatable to successively place the percussion-ignitable lamps of the multilamp unit received by said receiving means at an operative site;
   b. means, movable from a first position to a second position, for actuating percussive ignition of each operatively sited percussion-ignitable lamp of the received unit;
   c. means for urging said actuating means from said first position to said second position to thereby initiate percussive ignition of each operatively sited lamp;
   d. means, including a solenoid operatively associated with said actuating means and electrically connectable to and energizable by the camera synchroflash circuit, for controlling movement of said actuating means from said first position toward said second position, said solenoid having a member movable from a first location to a second location and engageable with said actuating means, said member when in said first location engaging said actuating means when in said first position to retain said actuating means against movement from said first position toward said second position, said member being movable from said first location to said second location in response to energization of said solenoid to release said actuating means for movement from said first position toward said second position;

e. means, including rotatable camming means engageable with said actuating means, for returning said actuating means from said second position to said first position; and f. means, coupled to said receiving means and said returning means and insertable into the camera socket, for operatively connecting said adapter to the camera, said connecting means when inserted in the camera socket thereby coupling said receiving means and said returning means to the camera socket for rotation therewith by the camera socket rotating means and electrically connecting said controlling means to the camera synchroflash circuit for energization thereby in synchronization with picture-taking operation of the camera.

12. The adapter claimed in claim 11 wherein said actuating means includes a striking element that is moved into contact with the received unit to effect percussive ignition of each operatively sited lamp in response to movement of said actuating means from said first position to said second position.

13. The adapter claimed in claim 11 wherein said solenoid includes means for urging said member from said second location to said first location when said solenoid is not energized.

14. The adapter claimed in claim 13 wherein said member includes a cam surface which, when said member is in said first location, is engaged by said actuating means to move said member from said first location, in opposition to the influence of said solenoid urging means, as said actuating means is moved toward said first position, thereby enabling said actuating means to be moved to said first position, said member then being returned by said solenoid urging means to said first location to retain said actuating means in said first position.

15. The adapter claimed in claim 11 further comprising means, coupled to said actuating means and said controlling means and engageable with the camera when said connecting means is inserted into the camera socket, for securing said actuating means and said controlling means against rotation with said receiving means and said returning means when said connecting means is inserted in the camera socket and rotated by the camera socket rotating means.

16. An adapter to enable use of one type of flashlamp unit with photographic apparatus of the type having a socket for receiving another type of flashlamp unit, a synchroflash circuit activatable for energizing such other type of flashlamp unit received by the socket, and means for effecting operation of the apparatus, said adapter comprising:

a. means for receiving the one type of flashlamp unit;

b. means movable from a first to a second position for actuating ignition of the one type of flashlamp unit received by said receiving means;

c. means for biasing said actuating means towards said second position;

d. means for releasable blocking movement of said actuating means towards said second position, said blocking means being connectable to the synchroflash circuit to release said actuating means upon activation of the circuit;

e. means actuatable by the effecting means for returning said actuating means from said second position to said first position; and f. means for operatively connecting said adapter to the socket.

17. For use with a camera of the type having:
a housing;
an electric flash unit socket for receiving a multilamp photoflash unit of a first type having lamps ignitable by application of electrical energy, which socket is rotatable relative to said housing to sequentially position the lamps of such a unit at an electrical firing site; and
a synchroflash circuit for electrically energizing a lamp positioned at such a firing site,
an adapter comprising:

a. a mechanical flash unit socket for receiving a multilamp photoflash unit of a second type having lamps ignitable by the application of mechanical force to the unit, said socket being rotatable to sequentially position the lamps of such a unit at a mechanical firing site;

b. means for applying a mechanical force to a unit received in said mechanical flash unit socket to fire a lamp located at said mechanical firing site;

c. means for connecting said adapter to said camera, said means including means interconnecting said mechanical flash unit socket with the electric flash unit socket of the camera for common rotational movement; and d. means for holding said force applying means stationary relative to the housing of the camera during rotational movement of said sockets.

18. For use with a camera of the type having:
a housing;
an electric flash unit socket for receiving a multilamp photoflash unit of a first type having lamps ignitable by application of electrical energy, which socket is rotatable relative to said housing to sequentially position the lamps of such a unit at an electrical firing site; and
a synchroflash circuit for electrically energizing a lamp positioned at such a firing site;
an adapter comprising:

a. a mechanical flash unit socket for receiving a multilamp photoflash unit of a second type having lamps ignitable by the application of mechanical force to the unit, said socket being rotatable to sequentially position the lamps of such a unit at a mechanical firing site;

b. means for connecting said adapter to said camera, said means including means interconnecting said mechanical flashlamp socket with the electric flash unit socket of the camera for rotation together;

c. an actuating member resiliently urged from a first position to a second position to apply a mechanical force to a unit received in said mechanical flash unit socket to fire a lamp located at said mechanical firing site;

d. electrically releasable means for retaining said actuating member in its first position;

e. means for electrically connecting said releasable retaining means to the synchroflash circuit of the camera;

f. means for holding said actuating member stationary relative to the housing of the camera during rotational movement of said sockets; and g. means defining a cam surface rotatable with said sockets for engaging and camming said actuating member to said first position in response to rotation of said sockets.

19. For use with photographic apparatus of the type having means for receiving an electrically ignitable flashlamp unit and a synchroflash circuit for energizing a received unit; an adapter comprising:

a socket for receiving a multilamp flash unit of the type having lamps ignitable by the application of mechanical force to the unit, said socket being rotatable to sequentially position the lamps of a received unit at a firing site;

means movable from a first position to a second position for applying a mechanical force to a received unit to fire a lamp located at said firing site;

means for urging said force applying means from said first position towards said second position;

means energizeable by the synchroflash circuit of the photographic apparatus for controlling movement of said force applying means from said first position to said second position;

means for returning said force applying means from said second position to said first position in response to lamp positioning rotation of said socket; and means for connecting said adapter to the electrical flash unit receiving means of the photographic apparatus.

20. For use with photographic apparatus of the type having means for receiving an electrically ignitable flashlamp unit and a synchroflash circuit for energizing such a unit; an adapter comprising:

a socket for receiving a multilamp flash unit of the type having lamps ignitable by the application of mechanical force to said unit, said socket being rotatable to sequentially position the lamps of a received unit at a firing site;

means movable from a first position to a second position for applying a mechanical force to a received unit to fire a lamp located at said firing site;

means for urging said force applying means from said first position towards said second position;

means energizeable by the synchroflash circuit of the photographic apparatus for controlling movement of said force applying means from said first position to said second position; and means defining a cam surface rotatable with said socket for engaging and camming said force applying means to said first position in response to rotation of said socket.

21. A flash adapter comprising:

means for connecting said adapter to photographic apparatus;

a rotatable socket for receiving a multilamp photoflash unit of the type having a plurality of lamps actuable by striking and a preenergizeable, releasable striker associated with each lamp;

an actuating member movable from a first position to a second position to release a preenergized striker of a received unit; and means for holding said actuating member stationary during rotation of said socket to permit sequential positioning of lamps of a received unit in operative relation with said actuating member.

22. A flash adapter comprising:

a rotatable socket for receiving a multilamp photoflash unit of the type having a plurality of lamps actuable by striking and a preenergized releasable striker associated with each lamp;

means for connecting said rotatable socket to the rotatable socket of a photographic apparatus for rotation together;

an actuating member movable from a first position to a second position to release a preenergized striker of a received unit; and means for urging said actuating member from its first position to its second position;

means for releasably retaining said actuating member in its first position;

electromagnetic means energizeable for actuating said releasable retaining means to release said actuating member;

connecting means for electrically connecting said electromagnetic means to a synchroflash circuit of the photographic apparatus when said adapter is connected to the rotatable socket of the photographic apparatus;

means for holding said actuating member stationary during rotation of said sockets to permit sequential positioning of lamps of a received unit in operative relation with said actuating member; and means defining a cam surface rotatable with said sockets for moving said actuating member to said first position in response to rotation of said sockets.